March 1, 1932. P. MILLER 1,847,353
WHEELED VEHICLE AND MEANS FOR AUTOMATICALLY
SECURING THE SAME AGAINST MOVEMENT
Filed Dec. 27, 1930 2 Sheets-Sheet 2
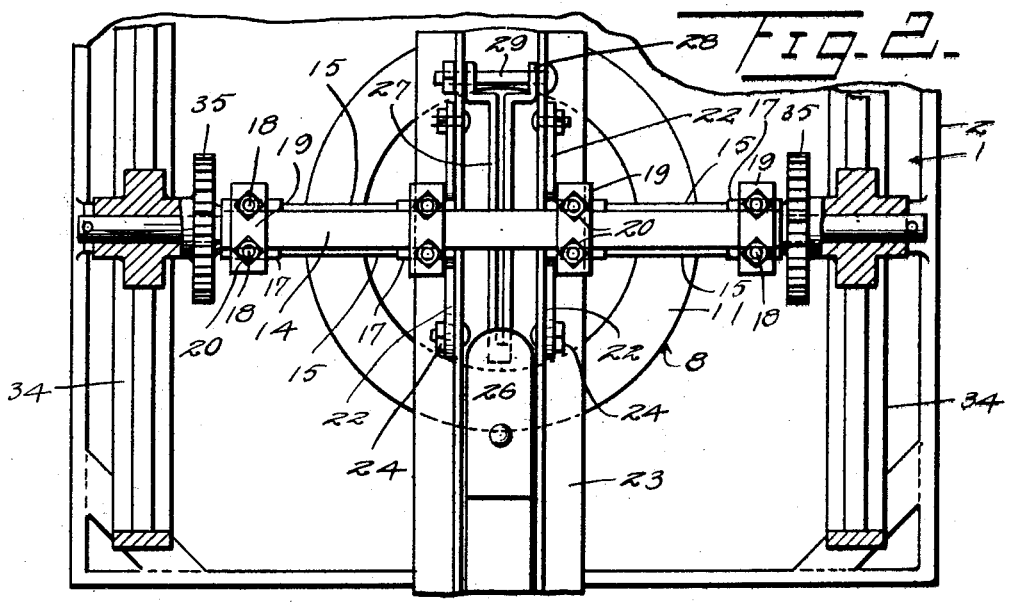
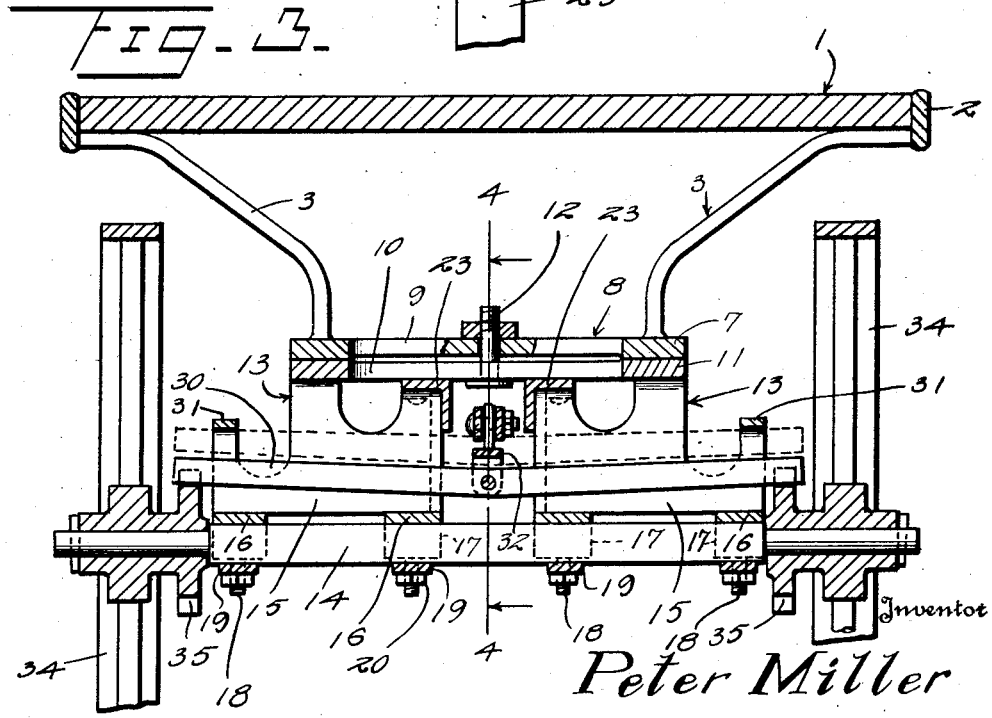
Inventor
Peter Miller
By Watson E. Coleman
Attorney Patented Mar. 1, 1932

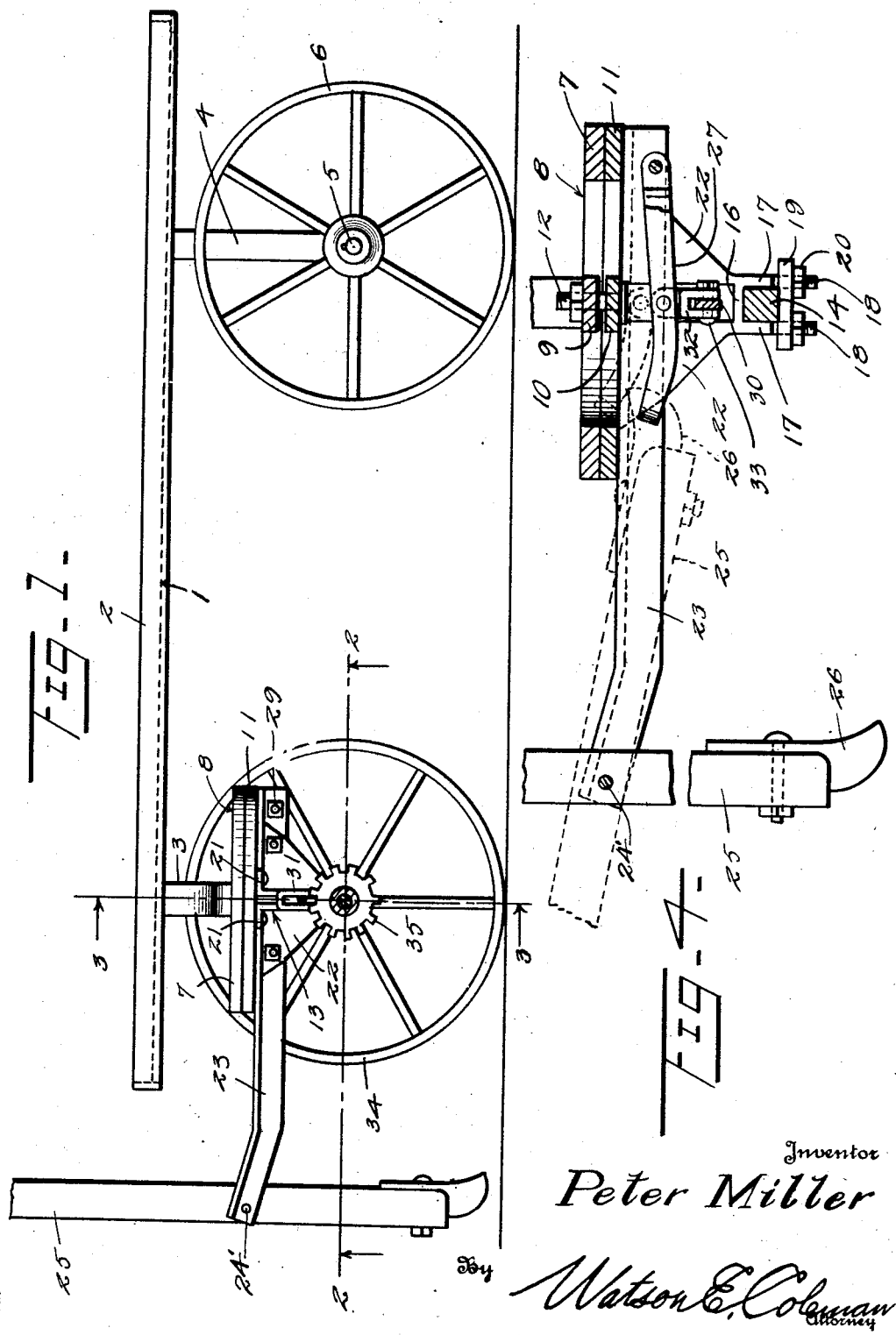

1,847,353

UNITED STATES PATENT OFFICE

PETER MILLER, OF KEARNEY, NEBRASKA

WHEELED VEHICLE AND MEANS FOR AUTOMATICALLY SECURING THE SAME AGAINST MOVEMENT

Application filed December 27, 1930. Serial No. 505,138.

This invention relates to improvements in wheeled vehicles and pertains particularly to means for securing hand trucks against accidental movement, when the same are brought to rest and the draft tongue thereof is released.

The primary object of the present invention is to provide an automatically operating device upon a hand truck such, for example, as trucks of the character commonly employed about depots for handling trunks and other baggage, which will automatically operate to lock the wheels of the truck against rotation when the handle or draft tongue is released.

Another object of the invention is to provide a means for locking the wheels of a truck, which is normally maintained inactive so long as the draft tongue of the truck is held in the position normally assumed by it while the truck is being moved about, the tongue being mounted in such a manner as to assume a vertical position when released, and thus release the securing means and permitting it to operate to lock the vehicle wheels against movement.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

Figure 1 is a view in side elevation of a truck equipped with the mechanism embodying the present invention.

Figure 2 is a sectional view taken on the line 2—2 of Figure 1.

Figure 3 is a sectional view taken on the line 3—3 of Figure 1.

Figure 4 is a sectional view taken on the line 4—4 of Figure 3.

Referring more particularly to the drawings, wherein like numerals of reference indicate corresponding parts throughout the several views, the numeral 1 indicates the floor or platform of the truck which, in the present construction, is shown as being mounted in a frame 2 from which there extends inwardly and downwardly from opposite sides the front and rear bolster arms 3 and 4 respectively. The rear bolster arms 4 are mounted in any suitable manner upon an axle 5 supported by the wheels 6.

The front bolster arms 3 are carried by the upper ring 7 of a fifth wheel which is indicated generally by the numeral 8, this fifth wheel having a central bar 9 which overlies a similar central bar 10 carried by the lower or removable ring 11 of the fifth wheel, through which bars the pivot or king pin 12 passes.

The fifth wheel structure 8 is supported upon the two bolster units 13 which are disposed in alignment upon the front axle 14 in the manner shown. Each of these bolster units is formed of a pair of plates 15 disposed in side by side relation and joined at their lower edges by the cross members 16 from each of which cross members there projects downwardly the spaced ears 17 between which the axle 14 is disposed, these ears carrying downwardly extending threaded pins 18 on their lower ends which extend through the ends of cross bars 19 which are held in position thereon by the nuts 20. The top edges of the plates 15 of each bolster unit are formed to provide laterally extending ears 21 which are secured to the movable ring 11 of the fifth wheel. It is, of course, understood that this is only one of several ways in which a strong connection may be made between the ring 11 and the plates 15 of the bolster units. Therefore, the invention is not to be restricted in any manner to the particular method here shown of assembling the parts.

The adjacent edges of the bolster units 13 are disposed upon the axle 14 in spaced relation, as is clearly shown in Figure 3, and each of the plates 15 has extending laterally therefrom, longitudinally of the truck, the integral ear plate 22, the ear plates of adjacent unit plates being in alignment so that there is thus formed two spaced parallel walls over the central portion of the front axle 14.

Extending normally longitudinally of the truck beneath the rotating plate 11 of the fifth wheel is a pair of spaced beams 23 disposed in parallel relation. These beams are of angle shape and each has one angle positioned between the top edges of the plates 15 of the bolster units and the ring 11 of the fifth wheel, while the other flange extends downwardly against the inner faces of the adjacent ear plates 22, to which it is bolted as indicated at 24. The beams 23 together constitute what might be termed a stub tongue for the truck, the forward ends thereof projecting a substantial distance beyond the front end of the truck platform, as shown in Figure 3, where they are turned up slightly as illustrated. Between these upturned forward ends of the beams 23 forming the stub tongue, there is positioned a bolt 24' on which is mounted a main tongue 25, the bolt passing through the main tongue inwardly of the rear end thereof, as shown, so that the main tongue may be oscillated between the beams of the stub tongue, and the distance between the point where the bolt 24' passes therethrough and the adjacent end, is sufficient to bring the said adjacent end up beneath the rotatable ring 11 of the fifth wheel, when the main tongue is oscillated to substantially horizontal position. The inner or rear end of the main tongue 25 is provided with a toe 26 which is formed of a body of metal of a weight sufficient to swing the inner end of the tongue downwardly when it is released so that when the truck is not in use the tongue 25 will assume a vertical position, as shown in Figure 1.

Disposed longitudinally between the stub tongue beams 23 over the axle 14, is a longitudinally split or slotted lever 27, the rear end of which is provided with the spaced parallel, longitudinally extending ears 28 which are pivotally mounted upon a pin 29 which extends transversely of the vertical flanges of the beams 23 adjacent their rear ends. The forward end of the lever 27 is curved upwardly slightly, as shown in Figure 4, and is in a position to be engaged and lifted by the toe 26 of the main tongue, when the latter is lowered for the purpose of moving the truck.

Extending transversely of the truck over the axle 14 and between the plates 15 of the bolster units, is a latch bar 30, the ends of which project beyond the outer edges of the plates of the bolster units as shown in Figure 3. At their outer edges the plates of the bolster units are connected over the latch bar 30 by a transversely extending portion 31, which forms a yoke which limits the vertical movement of the adjacent end of the latch bar. Intermediate its ends the latch bar 30 passes between a pair of spaced ears forming the lower portion of a link 32 which provides a connecting means between the latch bar and the lever 27, the upper part of the link 32 being in the form of a single ear which extends through the slotted lever and is pivotally attached thereto so that it may swing longitudinally of the truck. A pivot pin 33 passes through the latch bar 30 and the spaced ears forming the lower part of the link 32, so that the latch bar is permitted to oscillate in a vertical plane extending transversely of the truck.

Upon the outer ends of the axle 14 are mounted the wheels 34 and the hub of each of these wheels is formed upon the inner side of the wheel to provide a notched or toothed disk or wheel 35. Each end of the latch bar 30 extends across the toothed edge of a wheel 35 so that when the latch bar is lowered each end may engage between a pair of teeth of the adjacent disk.

From the foregoing description it will be readily seen that when the main tongue 25 of the truck is swung down to substantially horizontal position or, in other words, to working position, the toe 26 will engage the forward end of the slotted lever 27 and swing the same upwardly in the manner shown by dotted lines in Figure 4. This will cause the latch bar 30 to be lifted and thus free the ends thereof from contact with the toothed disks or wheels 35. The truck may then be freely moved about. When the operator of the truck leaves the same or releases his hold upon the main tongue 25 the weighted toe 26 will cause the tongue to swing to the vertical position shown and thus release the lever 27 to permit the latch bar 30 to drop onto the toothed peripheries of the disks 35. The ends of the latch bar will, of course, engage between certain of the teeth of the disks and thus hold the wheels 34 against rotation so that the truck may be safely left in any position, either upon a level or inclined surface, without fear of its moving.

Having thus described my invention, what I claim is:

1. In a land vehicle having a body, front and rear wheels and axles supported thereby; a draft tongue pivotally mounted at the front of the vehicle, vertically shiftable means mounted rearwardly of the draft tongue between the front wheels of the vehicle and adapted when in one position to connect with the adjacent wheels to hold the same against rotation, and means carrying said shiftable means and free of connection with the tongue when the tongue is in non-working position adapted to be engaged by the tongue of the vehicle when the tongue is moved to working position to actuate the wheel holding means to released position.

2. In a land vehicle having a body, front and rear wheels and axles supported by the wheels; toothed elements carried by the front wheels for rotation therewith, a vertically shiftable latching bar disposed transversely of the vehicle over the front axle and adapted to have its ends engage said toothed elements, a draft tongue pivotally mounted on the vehicle and adapted to lift said bar from contact with said elements when swung to working position, and means normally operating to maintain the draft tongue in a position free from connection with the latch bar.

3. In a land vehicle of the character described including a body, front and rear supporting wheels and axles connecting said wheels; a pair of bolster units disposed in spaced relation on the front axle and each formed to provide spaced guides extending longitudinally of the axle, a toothed plate member carried by each front wheel and rotatable therewith, a latching bar extending transversely of the vehicle through the guides of said bolster units and having its ends arranged to extend over the toothed elements, vertically oscillatable means disposed between the bolster units and connected with and supporting said latch bar, connecting means between the bolster units and the body of the vehicle, and a tongue member oscillatably mounted at the front end of the vehicle and adapted when lowered to a substantially horizontal position to engage the latch bar supporting means to lift the latch bar free from engagement with the toothed elements.

4. In a land vehicle of the character described including a body, front and rear supporting wheels and axles connecting said wheels; a pair of bolster units mounted in spaced relation upon the front axle, means connecting the bolster units with the vehicle body whereby rotation about a vertical pivot of the units with the adjacent wheels and axle is permitted, a pair of beams disposed in spaced parallel relation between said units and extending forwardly therefrom, a draft tongue pivotally mounted adjacent one end between the forward ends of said beams, a lever oscillatably mounted at one end between said beams, a latch element extending transversely of the vehicle and oscillatably supported by said lever, said tongue when oscillated to one position engaging the free end of said lever with the end adjacent the pivotal point thereof to lift the latch bar, and means rotatable with the front wheels for receiving the latch bar when the same is lowered, to hold the front wheels against rotation.

5. In a land vehicle of the character described including a body, front and rear supporting wheels and axles connecting said wheels; a pair of bolster units mounted in spaced relation upon the front axle, means connecting the bolster units with the vehicle body whereby rotation about a vertical pivot of the units with the adjacent wheels and axle is permitted, a pair of beams disposed in spaced parallel relation between said units and extending forwardly therefrom, a draft tongue pivotally mounted adjacent one end between the forward ends of said beams, a lever oscillatably mounted at one end between said beams, a latch element extending transversely of the vehicle and oscillatably supported by said lever, said tongue when oscillated to one position engaging the free end of said lever with the end adjacent the pivotal point thereof to lift the latch bar, and means rotatable with the front wheels for receiving the latch bar when the same is lowered, to hold the front wheels against rotation, said tongue being weighted to normally cause the same to move out of engagement with said lever.

6. In a land vehicle of the character described including a body, front and rear supporting wheels and axles connecting said wheels, a pair of bolster units arranged in spaced relation on said front axle, a fifth wheel including a pair of rings pivotally joined together, one of said rings being connected with the body of the vehicle and the other thereof being carried by said units, a pair of beams extending beneath said fifth wheel and arranged in spaced parallel relation between the bolster units, said bolster units being formed to provide guides extending transversely of the vehicle, a lever pivotally mounted at one end adjacent and between the rear ends of said beams, to oscillate in a vertical plane therebetween, a latch bar extending transversely of the vehicle in said guides, link connecting means between said latch bar and said lever whereby oscillation of the bar is permitted in planes extending longitudinally and transversely of the vehicle, toothed plates connected with said front wheels for rotation therewith and arranged to be engaged by the ends of said latch bar when the same is lowered, and a draft tongue pivotally mounted adjacent one end between the forward ends of said beams and adapted to have the said adjacent end moved beneath the free end of said lever to lift the same and the latch bar.

7. In a land vehicle of the character described including a body, front and rear supporting wheels and axles connecting said wheels, a pair of bolster units arranged in spaced relation on said front axle, a fifth wheel including a pair of rings pivotally joined together, one of said rings being connected with the body of the vehicle and the other thereof being carried by said units, a pair of beams extending beneath said fifth wheel and arranged in spaced parallel relation between the bolster units, said bolster units being formed to provide guides extending transversely of the vehicle, a lever pivotally mounted at one end adjacent and between the rear ends of said beams, to oscillate in a vertical plane therebetween, a latch bar extending transversely of the vehicle in said guides, link connecting means between said latch bar and said lever whereby oscillation of the bar is permitted in planes extending longitudinally and transversely of the vehicle, toothed plates connected with said front wheels for rotation therewith and arranged to be engaged by the ends of said latch bar when the same is lowered, a draft tongue pivotally mounted adjacent one end between the forward ends of said beams and adapted to have the said adjacent end moved beneath the free end of said lever to lift the same and the latch bar, and means forming a part of said units for limiting the upward movement of the latch bar.

8. In a wheeled vehicle including a body having front and rear supporting wheels and means for pivotally attaching the wheels thereto; means forming a guideway extending transversely of the body between the front wheels, a bar disposed in said guideway for movement vertically, elements carried by and rotatable with the front wheels formed to be engaged by the ends of the bar when the same is in one position, a tongue pivotally connected to the vehicle for oscillation in a vertical plane, and means arranged for engagement by the tongue when oscillated to working position to lift said bar from engagement with said elements.

9. In a wheeled vehicle including a body having front and rear supporting wheels and means for pivotally attaching the wheels thereto; means forming a guideway extending transversely of the body between the front wheels, a bar disposed in said guideway for movement vertically, elements carried by and rotatable with the front wheels formed to be engaged by the ends of the bar when the same is in one position, an elongated member pivotally connected with said guideway forming means and extending transversely of the bar and further having pivotal connection therewith, and a tongue pivotally connected with the vehicle for oscillation in a vertical plane, said tongue when moved to working position engaging said elongated member to raise the same and the bar and disconnect the ends of the bar from said elements.

In testimony whereof I hereunto affix my signature.

PETER MILLER.